AUDIO FREQUENCY OUTPUT AMPLIFIER

Filed July 30, 1951 2 Sheets-Sheet 1

Inventor
PIERRE H. J. MASSAUT
By R. G. Miller
Attorney

April 3, 1956 P. H. J. MASSAUT 2,740,850

AUDIO FREQUENCY OUTPUT AMPLIFIER

Filed July 30, 1951 2 Sheets-Sheet 2

Inventor
PIERRE H.J. MASSAUT
By R. G. Miller
Attorney

United States Patent Office 2,740,850
Patented Apr. 3, 1956

2,740,850

AUDIO FREQUENCY OUTPUT AMPLIFIER

Pierre Henri Joseph Massaut, Antwerp, Belgium, assignor to International Standard Electric Corporation, New York, N. Y., a corporation of Delaware Application July 30, 1951, Serial No. 239,213

Claims priority, application Netherlands August 2, 1950

4 Claims. (Cl. 179—171)

The invention relates to means for improving the transient response of loudspeakers and more particularly those which are connected as output load to an amplifier.

It is well known that loudspeakers, even if they present a satisfactory amplitude versus frequency characteristic, do not, however, reproduce transients without a substantial amount of distortion. Accordingly, for certain musical instruments such as pianos and drums, where the transient effects are important, one cannot expect a high quality reproduction.

The deficiencies with respect to the transient response of a loudspeaker can be attributed to two main causes, namely the inertia of the voice coil and the cone, i. e. its equivalent self induction together with the electrical self induction of the coil, causing an appreciable rise time for a steep signal and the natural anti-resonant frequency of the loudspeaker causing overshoots for a steep signal.

Accordingly, an object of the invention is to provide means in an amplifier designed for connection to a loudspeaker, to obtain an improved transient response, so that e. g. in the case of an input square-wave signal, the rise time and the overshoots are substantialy reduced.

Another object of the invention is to obtain such reduction by making the output impedance increase as the frequency of the applied signals increases, without affecting the amplitude versus frequency response.

A feature of the invention resides in an amplifier of the voltage and current feedback type wherein the output impedance of said amplifier is large at the higher frequencies to be reproduced and low at the lower frequencies to be reproduced, whereas the amplification is substantially independent of frequency.

The above mentioned and other objects of the features of the invention will become more apparent and the invention itself will be best understood by referring to the following description of the embodiment taken in conjunction with the accompanying drawings in which.

Figure 1:
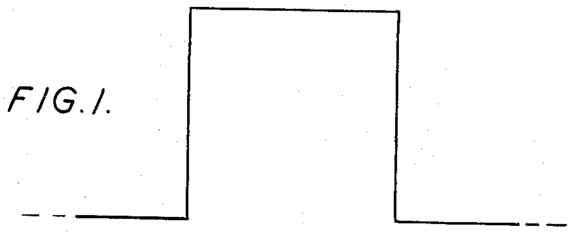
Fig. 1, represents a square-wave signal.
Figure 2:
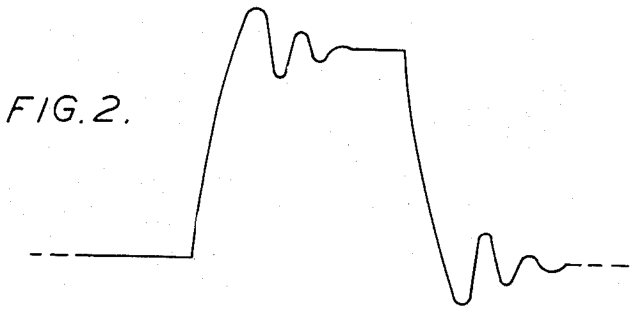
Fig. 2, represents the response of the loudspeaker diaphragm to the square-wave signal shown in Fig. 1.

Referring to Figs. 1 and 2, the first represents a square-wave signal while the second represents the displacement of the loudspeaker diaphragm in response to the square-wave signal shown on Fig. 1. The use of square-wave signals has been shown since it permits an easy appreciation of the distortion introduced by the loudspeaker's inability to reproduce transients. It will be assumed that the amplifier which is loaded by the loudspeaker does not present any distortion.

Fig. 2, shows an appreciable rise time for the square-wave signal which is primarily due to the mechanical inertia of the movable elements of the loudspeaker, i. e. voice coil and cone, together with the self induction of the voice coil. The leakage inductance of the output transformer is also responsible for the lack of steepness in the response.

It will be observed that the curve shown on Fig. 2 does not immediately reach its maximum value in an asymptotical manner but exhibits several overshoots which are due to the natural resonance of a loudspeaker.

A well known method to avoid the above mentioned overshoots is to feed the loudspeaker via low impedance source. In such a case, the loudspeaker which can be assumed to be equivalent to a damped anti-resonant circuit, will be provided with extra damping due to the low impedance source and, accordingly, the displacement of the voice coil will now be strongly damped by the practical short-circuit which is provided by the source.

Figure 3:
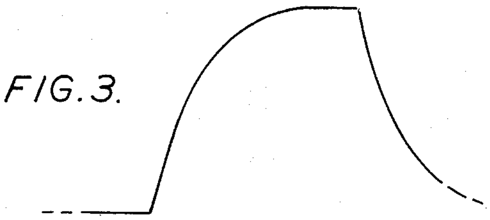
Fig. 3, represents a modified form of the response shown in Fig. 2.

However, this method has the disadvantage that the constant voltage source will not be able to instantaneously counteract the E. M. F. induced in the voice coil due to its displacement in the magnetic field. The current will thus increase slowly and the movement of the diaphragm will now be expressed by the curve shown on Fig. 3, which shows that the overshoots have been eliminated but that the rise time has been considerably increased.

Figure 4:
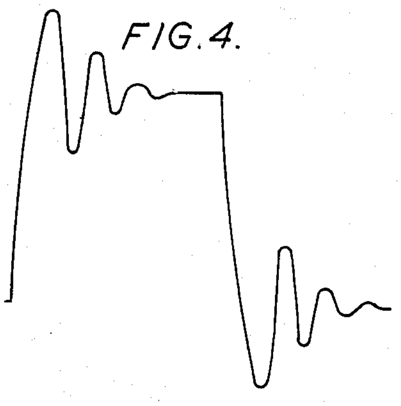
Fig. 4, represents another modified form of the response shown in Fig. 2.

On the other hand, if a constant current source is used, i. e. a high impedance source, the rise time will become very short but it will adversely affect the overshoots which will be considerably increased and accordingly the curve expressing the displacement of the diaphragm in response to a square-wave signal will now assume the shape shown on Fig. 4.

Hence, the use of either a low impedance or high impedance source solves one of the defects inherent to a loudspeaker with respect to the reproduction of transient phenomena but always aggravates the other. In view of this, the common practice has been to resort to a low impedance source permitting the elimination of the overshoots but introducing an appreciable rise time.

According to the invention, a method is proposed for the simultaneous elimination of these defects by using a low impedance source at low frequency and a high impedance source at high frequency.

This is based on the insight that the anti-resonant frequency of high quality loudspeakers is fairly low, in general below 100 C. P. S. and frequently of the order of 50 C. P. S. Thus, it is primarily important that the impedance of the source should be low at these low frequencies, or in other words, that the output impedance of the amplifier should be low.

On the other hand, by referring to the Fourier analysis of a square-wave signal, i. e. sum of sine waves, the frequency of which increases in an arithmetical progression with respect to the frequency of the signal, it appears that the steep flank of the square-wave is due to the higher frequency sine waves. Such a consideration leads one to believe that a short rise time will be obtained if the source impedance is high at the higher frequencies to be reproduced.

It is obvious that since we are to obtain a source frequency for the loudspeaker or in other words an output impedance for the amplifier connected thereto which has to be low at low frequency and high at high frequency, a network satisfying these characteristics could be designed.

Figure 5:
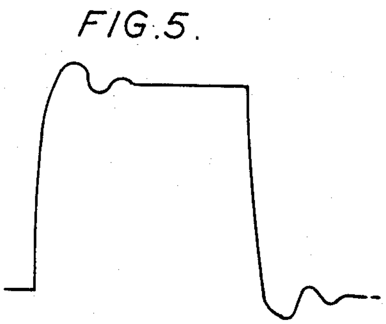
Fig. 5, represents a modification of the response in accordance with the invention.

If an output impedance which is high at high frequency, and low at low frequency can be obtained, the response of the diaphragm will now be as shown on Fig. 5, from which it is seen, by comparing the response to that shown on Fig. 2, that the rise time has been shortened and also that the overshoots have been reduced.

However, the insertion of such a network between the last stage of the amplifier and the loudspeaker would not give a satisfactory solution since its amplitude versus frequency characteristic would be totally inadequate.

Voltage feedback can be used for reducing the output impedance of the amplifier and is in fact a well known method of improving the transient characteristic of loudspeakers. But since it provides a low output impedance for the amplifier, it will only diminish the overshoots and will not favourably affect the rise time.

It might seem possible, however, that by making the voltage feedback dependent upon frequency, an output impedance might be obtained which is low at low frequency and high at high frequency, thus satisfying the requirements for an improved transient response of the loudspeaker. It will be recognized that this method has the drawback that the total amplification must be high. Also, the frequency dependent network which has to be used to obtain the voltage feedback dependent upon frequency, has to be carefully designed and is generally rather complex.

According to the invention it is proposed to use two feedback paths, namely a voltage feedback and a current feedback.

It is well known that feedback will appreciably modify the output impedance of an amplifier and if we call "$r$" the output impedance of an amplifier without feedback, i. e. plate impedance of the last tube, and $Z_0$ the output impedance of the amplifier with feedback, we have $$Z_0=\frac{r-AR_kb}{1-Aa} \qquad (1)$$

where A is the amplification without feedback, $R_k$ the cathode resistor of the last tube from which current feedback is obtained and $a$ and $b$ the voltage and current feedback factors respectively. Since these factors will be negative, it will be appreciated that whereas voltage feedback will cause the output impedance of the amplifier to be decreased, current feedback will produce an increase of the output impedance.

Also, if we call A′ the amplification with feedback, this will be given by $$A'=\frac{A}{1-A\left(a+\frac{R_k}{Z_L}b\right)} \qquad (2)$$

where $Z_L$ is the load impedance of the amplifier.

From Equation 1, it therefore appears that if the voltage feedback is appreciable at low frequency whereas the current feedback is negligible, a low output impedance will be obtained at low frequency. On the other hand, if the current feedback is appreciable at high frequency, whereas the voltage feedback is negligible, a high output impedance will be obtained at high frequency.

Also, it will be appreciated that the amplification can be maintained substantially constant at all frequencies if care is taken in designing the feedback networks so that the sum $$a+\frac{R_k}{Z_L}b$$

remains substantially constant at all frequencies.

Figures 6, 7, 8:
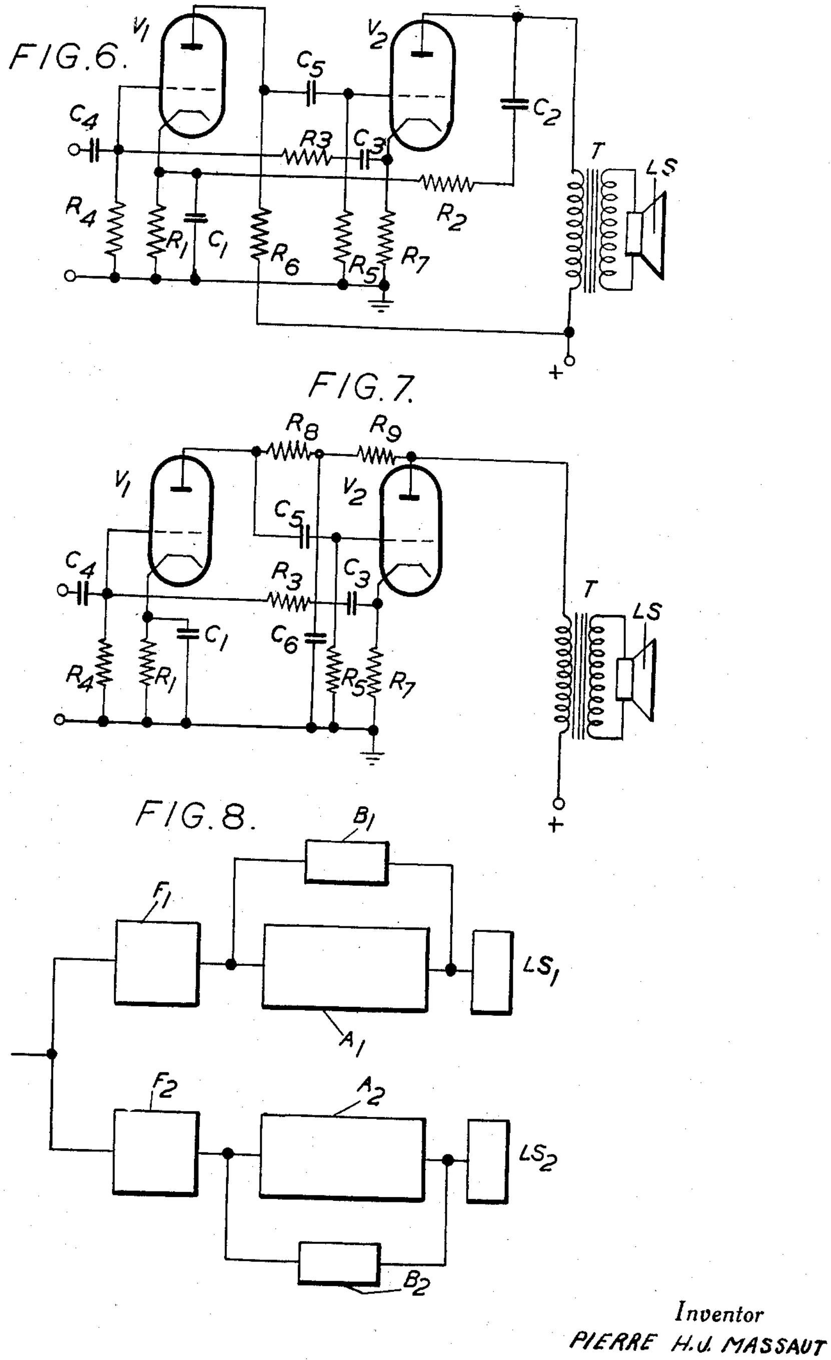
Fig. 6, represents an amplifier circuit in accordance with the invention.
Fig. 7, represents a modified form of the amplifier circuit shown in Fig. 6.
Fig. 8, represents an amplifier arrangement in accordance with the invention in which two loudspeakers (high and low frequencies) are used.

Referring to Fig. 6, an amplifier circuit according to the invention is shown. It comprises two stages of amplification, i. e. tubes $V_1$ and $V_2$ together with an output transformer T loaded by the loudspeaker LS. Positive battery potential is supplied to the anodes of the tubes $V_1$ and $V_2$ respectively via resistor $R_6$ and the primary winding of transformer T. Cathode resistors $R_1$ and $R_7$ have been provided for the tubes $V_1$ and $V_2$ while the usual grid coupling capacitors $C_4$ and $C_5$ together with the grid resistors $R_4$ and $R_5$ have been shown.

A voltage feedback network starting from the anode of tube $V_2$ and leading to the cathode of tube $V_1$ comprises a series arm including the blocking condenser $C_2$ and resistor $R_2$ while the shunt arm connected between cathode and ground comprises the cathode resistor $R_1$ in shunt with condenser $C_1$. The current feedback network starts from the cathode of tube $V_2$ and leads to the grid of tube $V_1$. Its series arm includes resistor $R_3$ and condenser $C_3$ while the grid resistor $R_4$ constitutes the shunt arm. It is to be noted that condenser $C_2$ has been used merely to prevent plate voltage from reaching the cathode of tube $V_1$ and its impedance can be deemed to be low at all frequencies.

From the above, it can be readily calculated that the voltage feedback factor $a$, which is the ratio between the voltage reaching the cathode of tube $V_1$ and the voltage at the plate of tube $V_2$, is given by $$a=\frac{-R_1}{R_1+R_2+pC_1R_1R_2} \qquad (3)$$

where $p$ is the imaginary angular frequency of the signal.

The current feedback factor which is the ratio between the voltage reaching the grid of tube $V_1$ and the voltage at the cathode of tube $V_2$ will be given by $$b=\frac{-pC_3R_4}{1+pC_3(R_3+R_4)} \qquad (4)$$

From Equation 3, it appears that at the higher frequencies to be amplified the voltage feedback factor "$a$" will be equal to $$-\frac{1}{pC_1R_2}$$

which can be neglected if $C_1R_2$ is sufficiently large. On the other hand, at the lower frequencies to be amplified the voltage feedback factor "$a$" will tend asymptotically towards the value $$\frac{-R_1}{R_1+R_2} \qquad (5)$$

Also, from Equation 4, at the lower frequencies to be amplified the current feedback factor "$b$" will be equal to $-pC_3R_4$ which can be neglected if $C_3R_4$ is sufficiently small. On the other hand, at the higher frequencies to be amplified, the current feedback factor "$b$" will be equal to $$-\frac{R_4}{R_3+R_4} \qquad (6)$$

In this way, it will be appreciated that the output impedance of the amplifier which is given by Equation 1 will increase as the frequency increases. On the other hand, by suitable care in the design of the "$a$" and "$b$" networks, it will be possible to obtain an amplification A′ (Equation 2), which is substantially independent of the frequency.

By replacing "$a$" and "$b$" in terms of Equations 3 and 4 into Equation 2, various equations can be obtained by considering that A′ should have the same value at particular frequencies, e. g. at the two frequencies which limit the band of frequencies to be reproduced and at their geometric mean. It is obvious that by increasing the complexity of the feedback networks, it will be possible to have A′ practically independent of the frequency. This is purely a matter of designing suitable networks by methods which are already well-known.

It will be recognized that, although a two-stage amplifier using triode tubes has been shown on Fig. 6, other circuit arrangements could easily be designed according to the invention, using for example different tubes or a different number of stages of amplification.

For example, the blocking capacitor $C_2$ which is used in the circuit shown on Fig. 6 might prove to be a drawback in certain cases if it must have a low impedance at all frequencies. This can be avoided by using the circuit shown on Fig. 7 in which the voltage feedback network $R_1C_1$, $R_2C_2$ has now been replaced by a T-network comprising the resistors $R_8$ and $R_9$ together with condenser $C_6$ and interconnected between the two anodes of the tubes and ground. Also, battery potential is now applied to the tube $V_1$ via resistances $R_8$ and $R_9$ instead of via a separate resistor $R_6$. It will be remarked that in this second arrangement, the voltage feedback network is again dependent on frequency since condenser $C_6$ will provide a low impedance to ground at the higher frequencies to be amplified thus reducing the amount of feedback at those higher frequencies just as in the case of the arrangement shown on Fig. 6 (Equation 3). In designing this circuit, for an amplification substantially independent of frequency, care should be taken that the amount of amplification which has to be reckoned for the voltage feedback network is not the same as the amount of amplification which has to be reckoned for the current feedback network, in view of the fact that the voltage feedback network is now extended back to the anode of the tube $V_1$ instead of to the cathode.

It will also be appreciated that while the use of two feedback networks in accordance with the invention permits a substantial improvement of the transient response of a loudspeaker, the well-known advantages inherent to the use of feedback, e. g. improvement of the distortion, will also be afforded at all frequencies.

The invention is also applicable to those amplifiers which can be connected to two or more loudspeakers by means of a plurality of output circuits. Arrangements in which the low frequencies are reproduced by a first loudspeaker while the higher frequencies are reproduced by a second loudspeaker are well-known and as shown on Fig. 8, the invention might well be applied to those systems.

This figure shows the output part of an amplifier which is provided with twin output circuits. The first one, comprises a low pass filter $F_1$ leading to an amplification circuit, or to an amplifying tube $A_1$, which is loaded by the low frequency loudspeaker $LS_1$. The high frequency output circuit comprises the high pass filter $F_2$, the amplifying circuit $A_2$ and the high frequency loudspeaker $LS_2$.

In accordance with the invention, the amplifying circuit $A_1$ is provided with a voltage feedback network $B_1$ which will reduce the output impedance of the amplifier circuit $A_1$ to a low value at low frequency, thus reducing the overshoots in the transient response of the loudspeaker $LS_1$. On the other hand, the amplifying circuit $A_2$ is provided with a current feedback network $B_2$ which will increase the output impedance of the amplifying circuit $A_2$ at high frequency, thus reducing the rise time in the transient response of loudspeaker $LS_2$.

While the principles of the invention have been described above in connection with the specific apparatus, it is to be clearly understood that this description is made only by way of example and not as a limitation on the scope of the invention.

What I claim is:

1. In an amplifier circuit including an input circuit adapted to receive audio frequency signals, and an output circuit, means for the feedback of voltage from said output circuit to said input circuit in inverse relation to the frequency of an input signal and means for the feedback of current from said output circuit to said input circuit in direct relation to the frequency of an input signal, whereby to minimise the effect of time delay in the rise and fall time of transient signals.

2. In an amplifier circuit, means for maintaining the gain of said amplifier circuit substantially independent of frequency within the frequency range of signals to be amplified, said means comprising means responsive to the frequency of the amplified signal for effecting voltage feedback in inverse relation to the frequency of the amplified signal from the output to the input of said amplifier circuit and means responsive to the frequency of the input signal for effecting current feedback in direct relation to the frequency of said amplified signal from the output to the input of said amplifier circuit.

3. An amplifier circuit including an input tube and an output tube, means coupling said output tube in cascade with said input tube, an output transformer, means connecting said output transformer to the output circuit of said output tube, a plurality of resistors, means connecting the control element of each tube through one of said resistors to a point of fixed reference potential, means connecting the cathode element of each tube through one of said resistors to said point of fixed reference potential, a capacitor, and means series connecting the anode of said output tube through one of said resistors and said capacitor to the cathode of said input tube, a second capacitor connected in shunt across the cathode resistor of said input tube, and a series circuit including a resistor and a capacitor connected between the cathode of said output tube and the control element of said input tube.

4. In a two-stage audio amplifier circuit including an electron discharge device connected in an input circuit and a second electron discharge device cascade-coupled thereto to provide an output circuit, an output transformer and means connecting said transformer in the anode circuit of said second electron discharge device, the control and cathode elements of each said devices being connected through individual resistors to ground, a resistive series circuit including a pair of resistors connecting the anodes of said first and second devices, a capacitor, means for series connecting the junction point of said resistors through said capacitor to ground, and a series connected resistor and capacitor between the cathode of said second device and the control element of said first-mentioned device.

References Cited in the file of this patent

UNITED STATES PATENTS

| | | |
|---|---|---|
| 2,220,770 | Mayer | Nov. 5, 1940 |
| 2,365,575 | Maxwell | Dec. 19, 1944 |
| 2,383,867 | Koch | Aug. 28, 1945 |

FOREIGN PATENTS

| | | |
|---|---|---|
| 445,098 | Great Britain | Apr. 2, 1936 |
| 456,062 | Great Britain | Oct. 28, 1936 |

OTHER REFERENCES

"Radio Engineering," Terman, 3d ed., pp. 311–314, 320–325, pub. 1947 by McGraw Hill Book Co. New York.